3,064,428
HYDRAULIC MECHANISM FOR DRIVING RAIL
FASTENING SCREWS IN RAILROAD TIES
Franz Plasser and Josef Theurer, both of Johannesgasse 3, Vienna, Austria, and Karl Fölser, Garnisonstrasse 24, Linz, Austria
Filed Mar. 10, 1959, Ser. No. 798,510
Claims priority, application Austria Mar. 11, 1958
1 Claim. (Cl. 60—53)

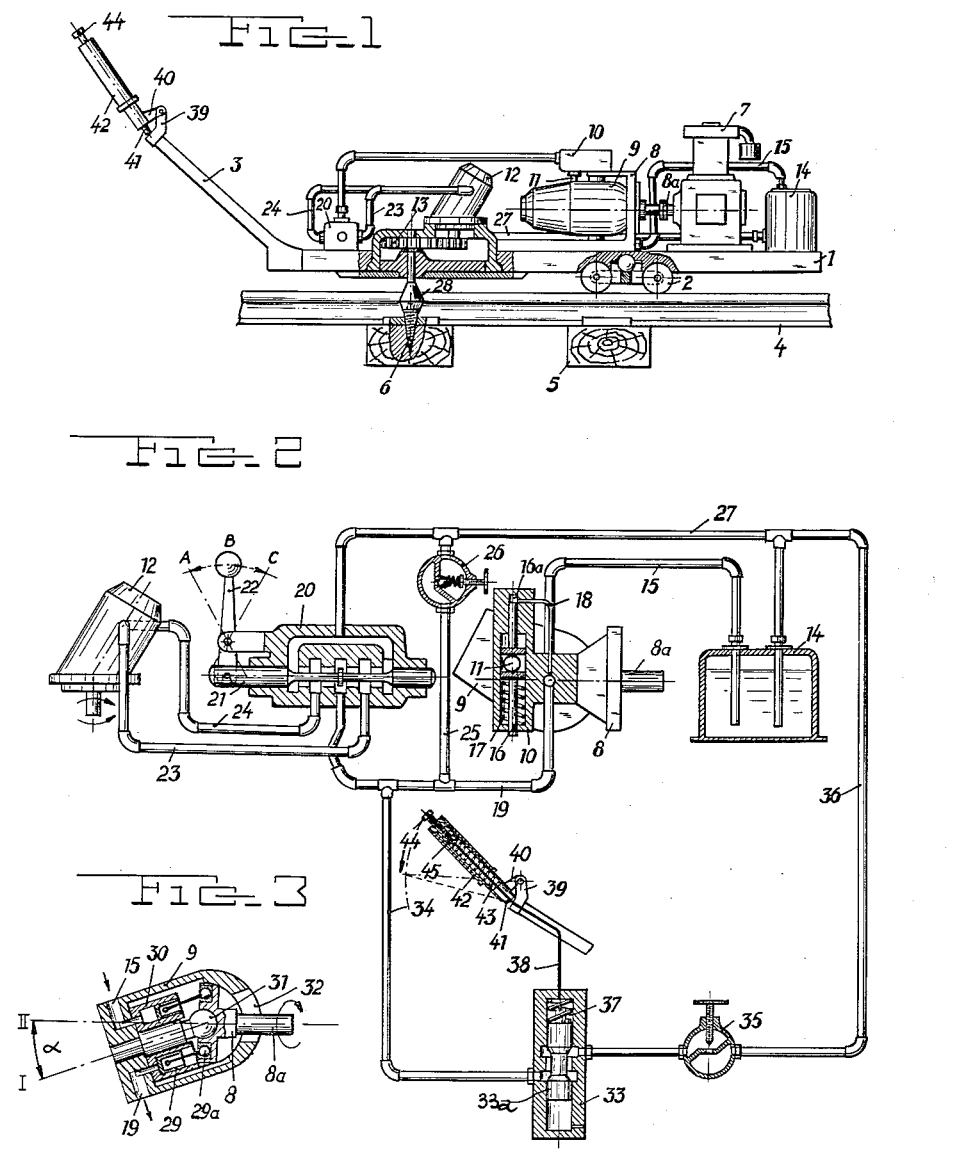

The present invention relates to a portable machine for driving rail fastening screws or bolts in railroad ties, and more particularly to an improved driving mechanism. If the screw gripping element is replaceably mounted in a rotatable chuck, such a machine may also be advantageously used for other track construction purposes, for instance for drilling pilot holes for the screws in the ties, by substituting a drill bit for the screw gripping element.

This is a continuation-in-part of application Serial No. 686,704, filed September 27, 1957, by Franz Plasser and Josef Theurer, two of the joint inventors.

Portable machines of this type comprise a light, wheeled chassis adapted to run on the railroad track and carrying the screw gripping elements, such as screwdrivers or wrenches, together with their driving mechanism. In operation, the machine is moved into position so that the fastening screw and the screw gripping element are in vertical alignment, the screw gripping element is actuated to grip the screw and rotated in the desired direction to loosen or tighten the screw in the tie.

In mechanically operated machines for driving rail fastening screws, it has been proposed to mount friction couplings and yielding clutches in the driving mechanism to control the torque stresses produced particularly when the screw is driven home to bear on top of the rail flange. As is known, however, friction couplings are subject to the influence of temperature and weather, wear rapidly, operate very noisily and involve considerable loss of energy. In addition, the prior art torque control means have been complicated in structure, slow in operation, subject to frequent breakdowns and difficult to handle.

Another serious difficulty encountered in the operation of machines of this type has been the proper alignment of the screw gripping element with the screw head, particularly in the case of polygonal screw heads to be gripped by wrenches with correspondingly polygonal recesses. To make gripping possible, the wrench or screwdriver must be rotated so that it fits exactly on the polygonal screw head or into the transverse slot therein, respectively. This manipulation has involved considerable time losses at each screw and has made the productivity of the machine dependent primarily on the individual skill and experience of the machine operator.

It is the primary object of the present invention to provide a fully automatic portable machine for driving rail fastening screws in railroad ties, which avoids the above disadvantages and provides a simple, dependable and speedily operating driving mechanism which includes a highly sensitive torque control. The ready fitting of the screw gripping element on the screw head is assured by incorporating a no-load stage in the driving mechanism so that the screw gripping element may be easily turned into a position in which it fits on the screw head.

In accordance with this invention, the screw gripping element and its driving mechanism are mounted on a light, frame-like chassis with wheels adapted to run on the railroad tracks and an upwardly extending handle fixed to one end of the chassis for pushing the chassis along the tracks. The driving mechanism is hydraulically operated. The hydraulic circuit includes a no-load branch to which the driving mechanism may be selectively connected to enable the screw gripping element to be subjected to an idling rotation which causes the element to turn slowly without being subjected to a working torque. In this condition, the gripping element, such as a recessed wrench, will turn into proper alignment with the corresponding polygonal screw head, whereupon the driving mechanism is connected with the power branch of the hydraulic circuit to drive the screw positively. While the wrench slowly turns during the no-load condition, it will automatically assume a position wherein the screw gripping element fits on the screw head. Thus, the operator need only vertically align the screw and the screw gripping element and loosely place the element on the screw head. During the idling rotation of the element, it will automatically engage the screw head as it reaches an angular position where the element fits on the screw head. The idling motion of the screw gripping element has not enough force to subject the screw to appreciable torsion or to cause noticeable friction between the element and the screw head. Therefore, no effort is required to remove the idling screw gripping element from the screw head after the driving operation has been completed.

During the power stage, the hydraulic drive may be easily protected from overloads. Its torque may be limited without difficulty by arranging a suitable valve in the hydraulic fluid supply circuit. It can be dependably adjusted regardless of the ambient temperature and visibly determined by mounting a manometer in the hydraulic circuit. Since hydraulic drives involve practically no energy losses, the operation of such a machine is very economical, the structure being simple and sturdy, which assures rapid and dependable work without breakdowns. The required torque is sensitively and automatically adjusted in response to the resistance encountered during turning, which eliminates the need for manual control or supervision. Preferably, an infinitely variable pump of known design is used to deliver the hydraulic fluid to the drive.

In accordance with one preferred embodiment of this invention, a throttle valve is mounted in the no-load branch of the hydraulic circuit to adjust the amount of hydraulic fluid flowing back through this branch and thus to adjust the pressure in the power branch. The proper adjustment of the control valve thus makes it possible to hold the pressure in the power branch so low that no appreciable torsional or frictional forces are transmitted to the screw gripping element while it is high enough to cause the element to turn slowly. Finally, a control valve in the no-load branch of the hydraulic circuit is operable to disconnect this branch so that the hydraulic fluid pump again may operate with full force to supply fluid to the hydraulic motor and to drive the screw gripping element as soon as the same has engaged the screw head.

The above and other objects, advantages and features of the present invention will be more fully explained in connection with a specific embodiment illustrated in the accompanying drawing wherein FIG. 1 is a side view, partly in section, of a portable machine for driving rail fastening screws in railroad ties;

FIG. 2 schematically illustrates the hydraulic drive mechanism in top view, partly in section; and FIG. 3 is a sectional view of an infinitely variable fluid delivery pump preferably used in the hydraulic drive mechanism.

Referring now to the drawing, there is shown a frame-like portable chassis 1 mounted on a truck with wheels 2. An upwardly extending handle 3 is fixed to one end of the chassis, whereby an operator may push the machine along track 4 fastened to wooden ties 5 by means of fastening screws 6. The handle also enables the operator to pivot the chassis about wheels 2 so that the screw gripping element 28 may be lowered sufficiently to engage the head of screw 6.

A motor 7 of any suitable design serves to drive the hydraulic fluid delivery pump. The pump produces the desired pressure in the hydraulic conduit system more fully illustrated in FIG. 2, a preferred pump being shown in FIG. 3.

The pump delivery rate or capacity is adjusted smoothly and in a stepless manner in dependence on the angle α assumed by the pivotal pump part 9. The pump comprises also a fixed pump part 8 which is fixedly connected to pump drive shaft 8a while the pivotal pump part 9 is adjustable between positions I and II. Pistons 29 glide in cylinder 30 mounted in the pivotal pump part, piston rods 29a being pivotally linked to fixed pump part 8. Pump part 9 is pivotal about ball-and-socket joint 31 and is provided with slot 32 accommodating shaft 8a during pivoting of part 9 between positions I and II. The pistons 29 are reciprocated by the rotation of the drive shaft 8a which is driven by motor 7. The piston stroke or displacement is determined by the angle α of pivotal pump part 9 which, in turn, determines the rate of fluid delivery from input conduit 15 to output or pressure conduit 19.

The hydraulic circuit includes a fluid delivery adjustment element 10 which controls the angular movement of pivotal pump part 9. Element 10 comprises a cylinder 16a and a piston 16. The piston engages the pivoting pin 11 which is connected to pump part 9 and pivots the same according to the position of the piston. In this manner, the pump delivery may be variably adjusted from zero (pump position II) to a maximum (pump position I).

The pump delivers hydraulic fluid, i.e. oil, to a conventional hydraulic motor 12 connected to reduction gear 13 (FIG. 1) to drive a chuck holding the wrench 28.

The hydraulic fluid is stored in tank 14 which is connected to the delivery pump by conduit 15. The pressure conduit 19 leads from the pump to a control valve 20. A small branch conduit 18 leads from the pressure conduit 19 to cylinder 16a of the fluid delivery adjustment element 10, whereby the hydraulic fluid delivered from the pump operates piston 16 against the bias of helical spring 17.

The control valve 20 has a piston 21 which can be selectively moved by an operator into positions A, B, C of actuating handle 22. Conduits 23 and 24 lead from the control valve to hydraulic motor 12 and form a hydraulic circuit with the motor. The direction of hydraulic fluid flow in this circuit depends on the positioning of handle 22 in position A or C.

Branch conduit 25 is connected between pressure fluid conduit 19 and return conduit 27 which conducts the fluid back to storage tank 14, the safety valve 26 being mounted in branch conduit 25.

The above-described circuit provides the positive hydraulic drive. Idling rotation is provided by the no-load branch conduit 34 connected to pressure line 19 and including return conduit 36 in which there is mounted a throttle valve 35. This valve regulates the amount of pressure fluid in the return line.

Valve 33 is mounted between the no-load line 34 and fluid return line 36. It is biased by a helical spring 37 and actuated by means of a cord 38. The cord actuating mechanism is mounted on handle 3 which carries a bracket 39 for pivotally supporting said mechanism. The arm 40 is pivotally supported by bracket 39 and has secured thereto a sleeve 42. Button 44 is mounted in the outer end of the sleeve and has an interior shoulder 20. An axially slidable body or pin 41 is mounted in the inner end of the sleeve, pin 41 being biased against the bracket 39 by helical spring 43 arranged between shoulder 45 and pin 41 in the interior of sleeve 42. The cord 38 is anchored to the button 44. When sleeve 42 is depressed in the direction of the arrow shown in FIG. 2, the tension of cord 38 is reduced, permitting spring 37 in valve 33 to depress piston 33a so as to close off communication between line 34 and line 36.

The machine operates as follows:

When the control valve 20 is in illustrated position B, the variable oil pump 8, 9 continuously and without pressure delivers hydraulic fluid from oil storage tank 14 and input conduit 15 to conduit 19 and back to the tank through return conduit 27 as well as conduits 34, 36 which are in communication through open valve 33, as shown in FIG. 2. The hydraulic motor 12 stands still.

When the handle 22 is moved to position A or C, the machine is in condition to place the lug wrench 28 in gripping engagement with the head of screw 6. The return of some of the hydraulic fluid through conduit 36 is choked off a little by throttle valve 35 so that a portion of the fluid will enter a supply line for hydraulic motor 12. The pressure of this fluid which is backed into the motor supply line will be very small but sufficient to turn the wrench 28 slowly. This rotational movement will be so weak as to create no appreciable torsional or frictional forces but the idling movement of the wrench will make it very easy to fit it over the screw head in properly aligned position.

When the wrench engages the screw head, the operator depresses sleeve 42 to release the tension of cord 38, the handle 22 having been thrown into position A or C, depending on whether it is desired to drive the screw home or to loosen it, i.e. to turn wrench 28 in one or the other direction. Relaxation of cord 38 permits the piston 33a in valve 33 to be pressed under the bias of spring 37 whereby return line 36 is closed off and the entire fluid is directed toward motor 12. In position A, the fluid will enter conduit 24 from conduits 19 and 34 to turn hydraulic motor 12 in one direction. In position C, conduit 23 becomes the pressure conduit, thus reversing the rotational direction of motor 12.

As soon as the screw is driven home and begins to resist further turning, the pressure in conduits 19, 34, 24 as well as in the small branch conduit 18 increases. The increased fluid pressure in branch conduit 18, which leads to fluid delivery adjustment element 10, moves the piston 16 against the bias of spring 17, thus pivoting pump part 9 toward its position II. Accordingly, the fluid delivery rate of the pump decreases as the fluid pressure in the hydraulic system increases, causing the rotation of motor 12 and wrench 28 to slow down. A substantially constant torque can be assured without difficulty by suitably choosing the characteristic of spring 17. Thus, the hydraulic driving system makes it possible always to use the entire power available from drive motor 7 without any energy loss.

When a predetermined maximal resistance has been reached, i.e. when the screw or bolt is tightly clamped onto the rail, the suitably adjusted safety valve 26 will automatically open under the increased fluid pressure in the system and the hydraulic fluid will return through conduit 25 directly to return conduit 27 and storage tank 14. Simultaneously, the operator will pivot sleeve 42 upwardly into the position shown in FIG. 2, whereby the valve 33 is opened and fluid will flow through line 36 into tank 14, there remaining only the previously described idling motion of motor 12, due to the very slight back pressure exerted by valve 35. While the motor idles, the wrench can readily be disengaged from the screw head and the machine is ready for the next operation.

This portable machine may obviously be used for driving any type of rail fastening screw, bolt or nut and will be particularly advantageous with lug wrenches having a recess of polygonal cross section for gripping a polygonal screw head of corresponding configuration. The rotatable chuck may exchangeably hold screwdrivers or wrenches for gripping various types of tie bolts or track bolts, or drill bits for making pilot holes for the screws or bolts.

The essential features of the present invention are (1) the portable chassis with its handle, (2) the hydraulic drive for the chuck and (3) for easy engagement of the screw gripping element with the screw head, the no load stage in the hydraulic system for permitting the hydraulic motor to idle and to turn the screw gripping element slowly and without exerting appreciable torque. Within this framework, many variations and modifications will occur to the skilled in the art, particularly after benefiting from the present teaching, without departing from the spirit and scope of this invention as defined in the appended claim.

What we claim is:

A hydraulic actuating mechanism for actuating a rail fastening screw driving apparatus, comprising a supply of hydraulic liquid; a pump having a suction conduit communicating with said supply and a discharge conduit; a rotary hydraulic motor having two feed lines, passage of liquid through said feed lines and said motor in opposite directions actuating rotation of the motor in opposite directions; valve means permanently communicating with said discharge conduit, said supply, and said feed lines and movable between three positions for selectively connecting said discharge conduit with a respective one of said two feed lines and with said supply for selectively rotating said motor in opposite directions and for by-passing said motor; two by-pass conduits, each communicating with said discharge conduit and said supply; shut-off valve means in one of said by-pass conduits, throttle valve means in said one by-pass conduit for maintaining a minimum pressure in said discharge conduit when said pump is operating and said shut off valve means is open; pressure relief valve means in the other one of said by-pass conduits for limiting the maximum pressure in said discharge conduit.

References Cited in the file of this patent

UNITED STATES PATENTS

| | | |
|---|---|---|
| 1,716,881 | Francis | June 11, 1929 |
| 1,995,168 | Bronander | Mar. 19, 1939 |
| 2,246,018 | Snyder | June 17, 1941 |
| 2,282,977 | Mast | May 12, 1942 |
| 2,410,869 | Ernst | Nov. 12, 1946 |
| 2,416,801 | Robinson | Mar. 4, 1947 |
| 2,475,304 | Bariffi | July 5, 1949 |
| 2,554,381 | Patterson | May 22, 1951 |
| 2,591,005 | Piper | Apr. 1, 1952 |
| 2,603,065 | Sarto | July 15, 1952 |
| 2,627,770 | Hautau et al. | Feb. 10, 1953 |
| 2,711,077 | Adams | June 21, 1955 |
| 2,887,907 | Lauck | May 26, 1959 |
| 2,887,920 | Austin | May 26, 1959 |

FOREIGN PATENTS

| | | |
|---|---|---|
| R 15,440 | Germany | Aug. 30, 1956 |
| | (Kl. 19a 28$_{14}$) | |